Sept. 14, 1965 R. B. GREENLY 3,206,557

RANDOM ACCESS TALKING MACHINE WITH INTENSITY MODULATED FILM

Filed Feb. 5, 1962 6 Sheets-Sheet 1

ROBERT B. GREENLY
INVENTOR

BY Richard G. Stephens
ATTORNEY

ROBERT B. GREENLY
INVENTOR
BY Richard D. Stephens
ATTORNEY

ROBERT B. GREENLY
INVENTOR

BY Richard G. Stephens
ATTORNEY

Sept. 14, 1965 R. B. GREENLY 3,206,557

RANDOM ACCESS TALKING MACHINE WITH INTENSITY MODULATED FILM

Filed Feb. 5, 1962 6 Sheets-Sheet 5

Sept. 14, 1965 R. B. GREENLY 3,206,557

RANDOM ACCESS TALKING MACHINE WITH INTENSITY MODULATED FILM

Filed Feb. 5, 1962 6 Sheets-Sheet 6

ROBERT B. GREENLY
INVENTOR

BY Richard D. Stephens
ATTORNEY

United States Patent Office 3,206,557
Patented Sept. 14, 1965

3,206,557

RANDOM ACCESS TALKING MACHINE WITH INTENSITY MODULATED FILM

Robert B. Greenly, Endicott, N.Y., assignor to Link Division of General Precision, Inc., Binghamton, N.Y., a corporation of Delaware Filed Feb. 5, 1962, Ser. No. 171,044
20 Claims. (Cl. 179—100.3)

This invention relates to apparatus for converting applied digitally encoded messages to outgoing spoken or aurally recognizable messages, and more particularly to improved apparatus in which a large vocabulary of desired words or audio sounds may be stored and later retrieved rapidly and selectively in accordance with an applied computer signal.

Apparatus intended to accomplish the basic functions of the present invention has been heretofore proposed, but so far as I am aware, none of the prior art devices have enjoyed extensive use. A device known as the "Vocameter" comprised an aural readout attachment to a digital voltmeter employing a series of magnetically coated discs to permit recording and playback of individual desired words using conventional magnetic recording techniques. It also has been proposed heretofore to record and read desired messages from sound tracks recorded on conventional or modified motion picture film. Recording and playback of sound tracks on film requires mechanical translation of the film past a fixed station both during recording and playback operations. Because the long lengths of film required to store a sufficient vocabulary cannot be moved mechanically fast enough, it is difficult with such apparatus to play back recorded words or messages in an order or sequence different from the recorded sequence without noticeable and disconcerting interruptions. Magnetic tape recording devices suffer from the same limitations, and the magnetic disc apparatus is limited in speed by mechanical apparatus required to shift discs or reading heads. In any system which requires many very rapid and accurate mechanical motions, machine wear becomes an important problem.

In the invention aural vocabulary storage is provided in the form of one or more photographic record plates upon which sounds are recorded by variable optical density recording, and with respect to which audio storage and retrieval are accomplished by means of an electronic flying spot scanner system.

Thus it is an object of the invention to provide an improved apparatus for converting applied encoded messages to aurally recognizable messages.

It is a more specific object of the invention to provide apparatus of such type which is capable of rapid random access to a relatively large vocabulary.

It is a further object of the invention to provide apparatus of the type mentioned which requires a minimum of moving mechanical parts, and particularly, which does not require rapid mechanical movement of a storage element relative to a pickup element.

It is an allied object of the invention to provide such apparatus in an arrangement which obviates moving or sliding frictional contact with the storage medium, thereby obviating frictional wear of the storage medium.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 5:
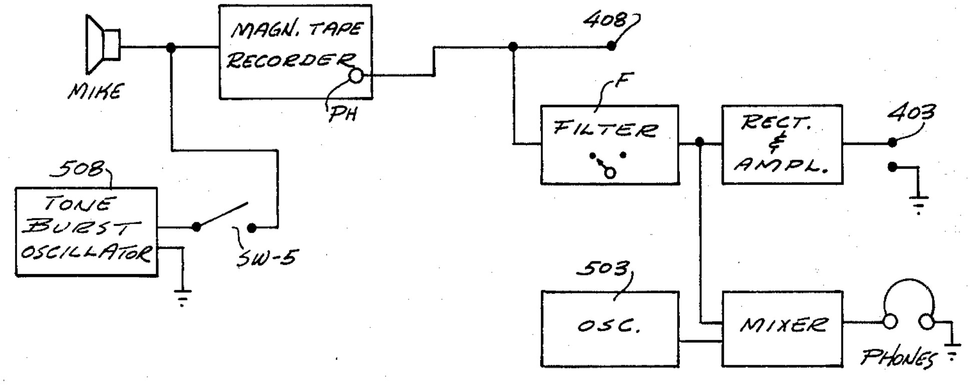
Figure 3:
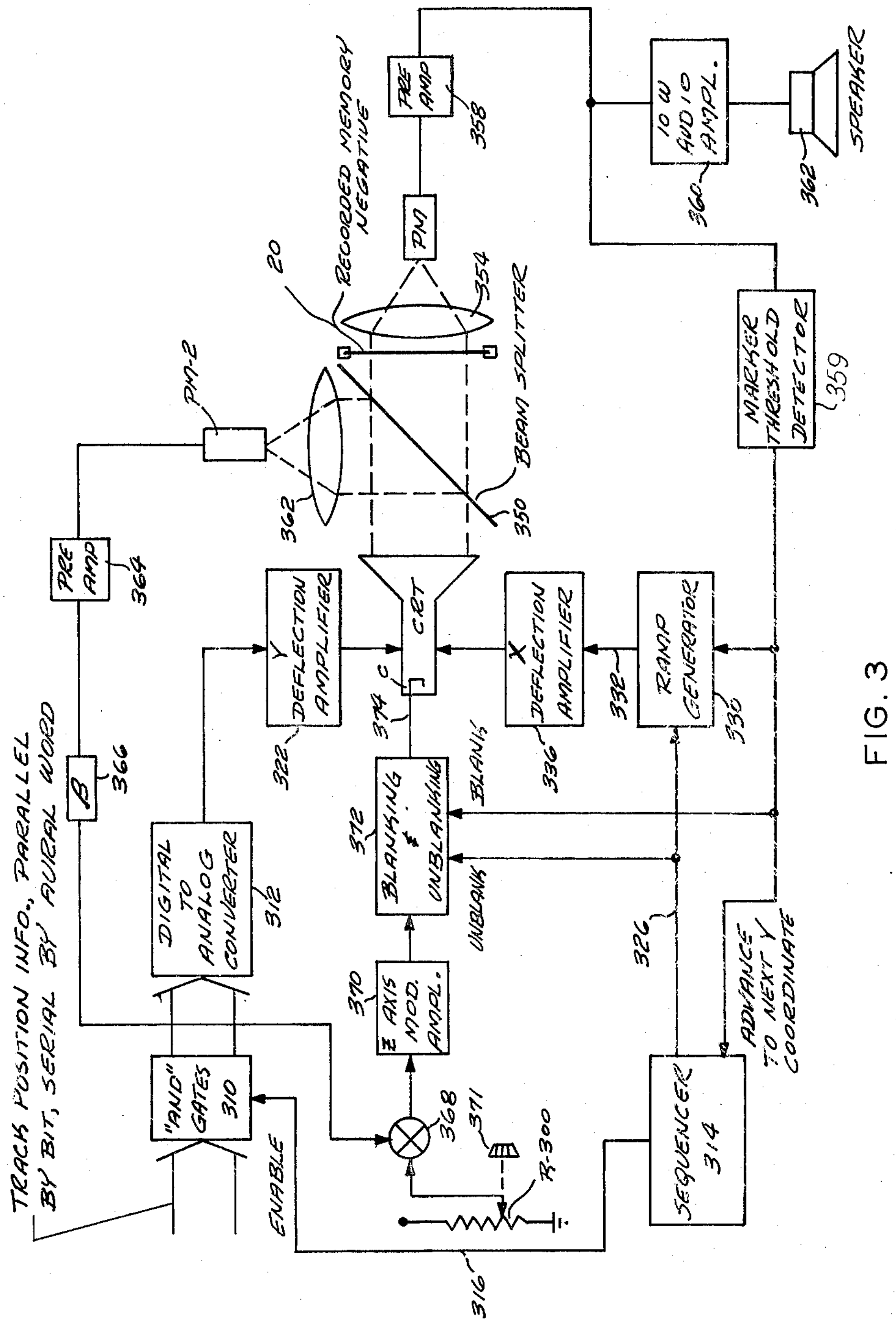
FIG. 3 is an electrical schematic diagram illustrating an exemplary audio playback or reproducing device constructed in accordance with the invention.
Figure 4A:
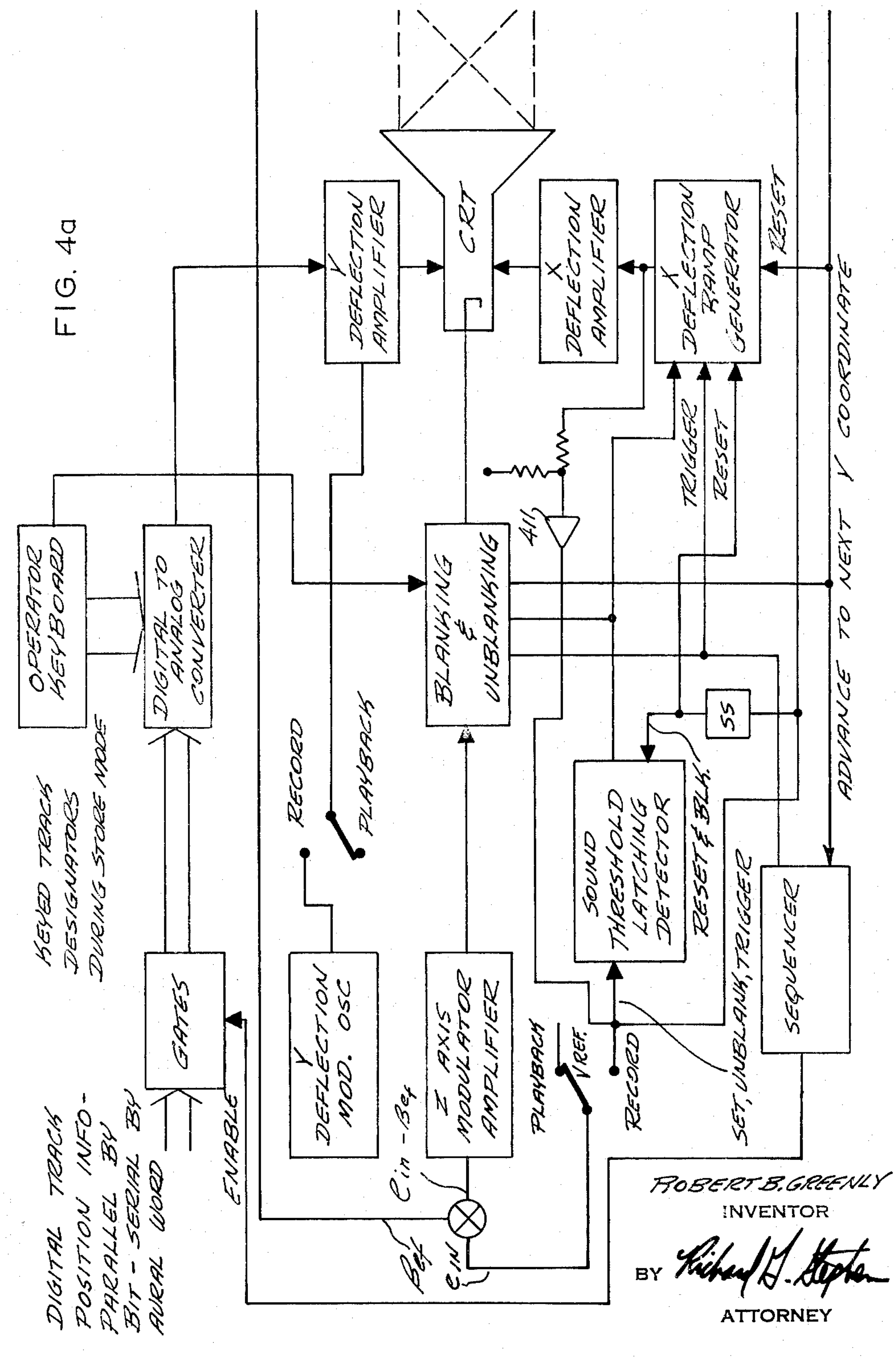
Figure 4B:
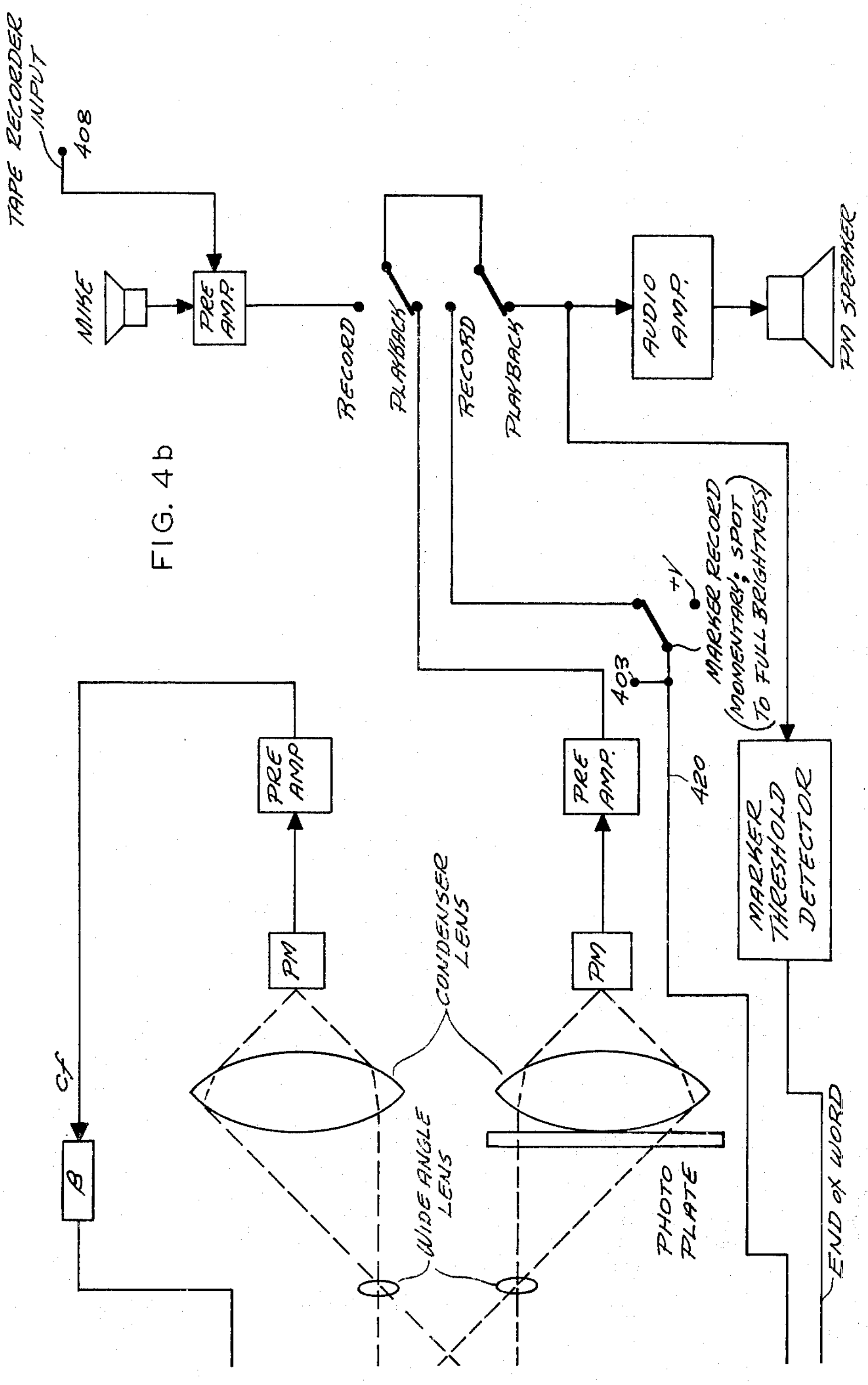
Figure 6:
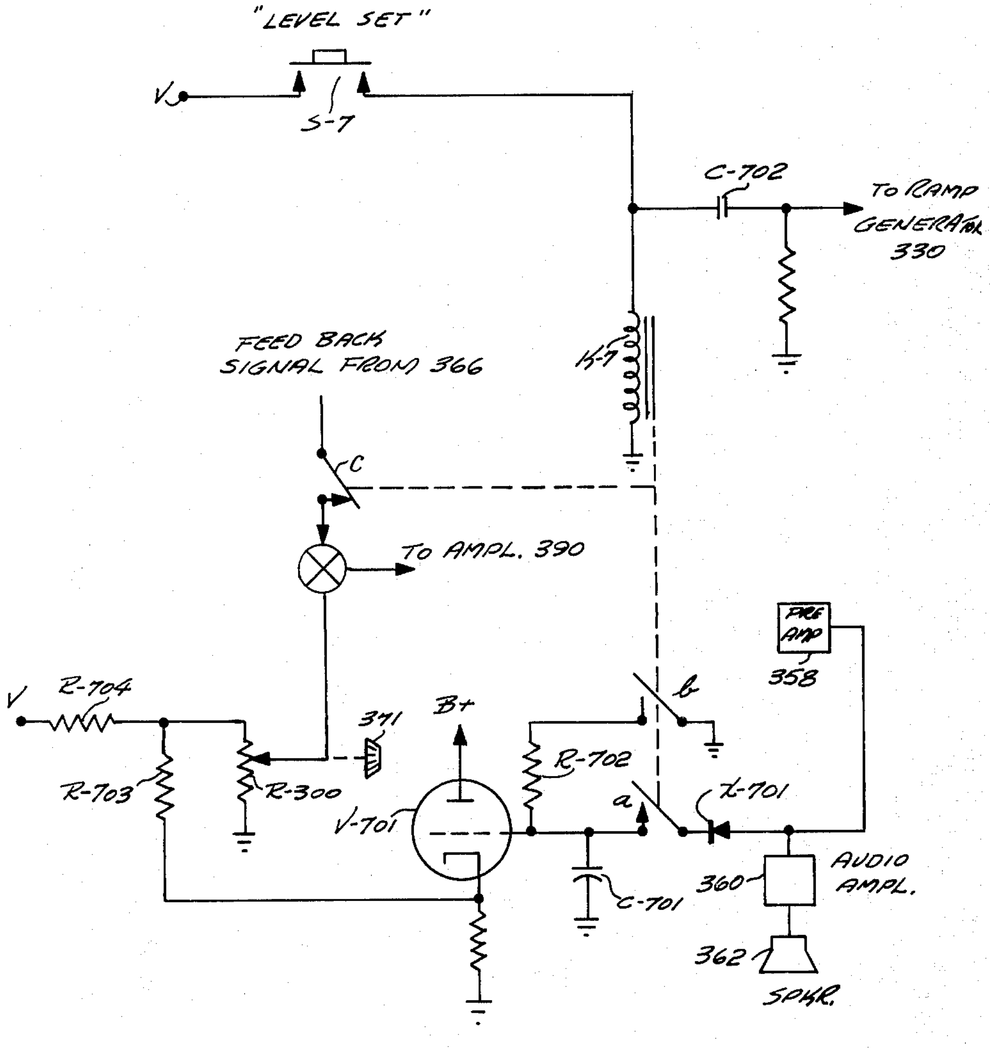

FIGS. 4*a* and 4*b*, hereinafter collectively referred to as FIG. 4, constitute an electrical schematic diagram of an exemplary combined recording-reproducing, or "dual-mode" apparatus constructed in accordance with the invention;

FIG. 5 is an electrical schematic diagram illustrating auxiliary magnetic tape recording and reproducing apparatus useful in editing magnetic tape for use with the apparatus of FIG. 4;

FIG. 6 is an electrical schematic diagram of auxiliary apparatus which may be used in conjunction with the reproducer apparatus of FIG. 3 to automatically adjust the operating level of the reproducer in accordance with a condition of the photographic memory negative.

The conversion system of the invention is designed to operate in either of two basic operating modes—(1) recording, or (2) playback. The result of the recording mode is a photographic negative 20 containing successively recorded tracks of audio information, intensity modulated, in the manner shown in FIG. 1, except that the size and spacings of the tracks and the intensity lines of the tracks are shown greatly exaggerated in FIG. 1 for convenience of illustration. Each train in FIG. 1 may be deemed to represent a single word or short phrase from the desired machine vocabulary. Track selection during the recording mode is made by switching means shown in FIG. 2 as comprising a manual operator keyboard. The keyboard is arranged to provide a unique digital output signal for each different word or short message, and the same digital signal (or, if desired, a different digital signal) will later be operative to select the same word during the playback mode.

Figure 2:
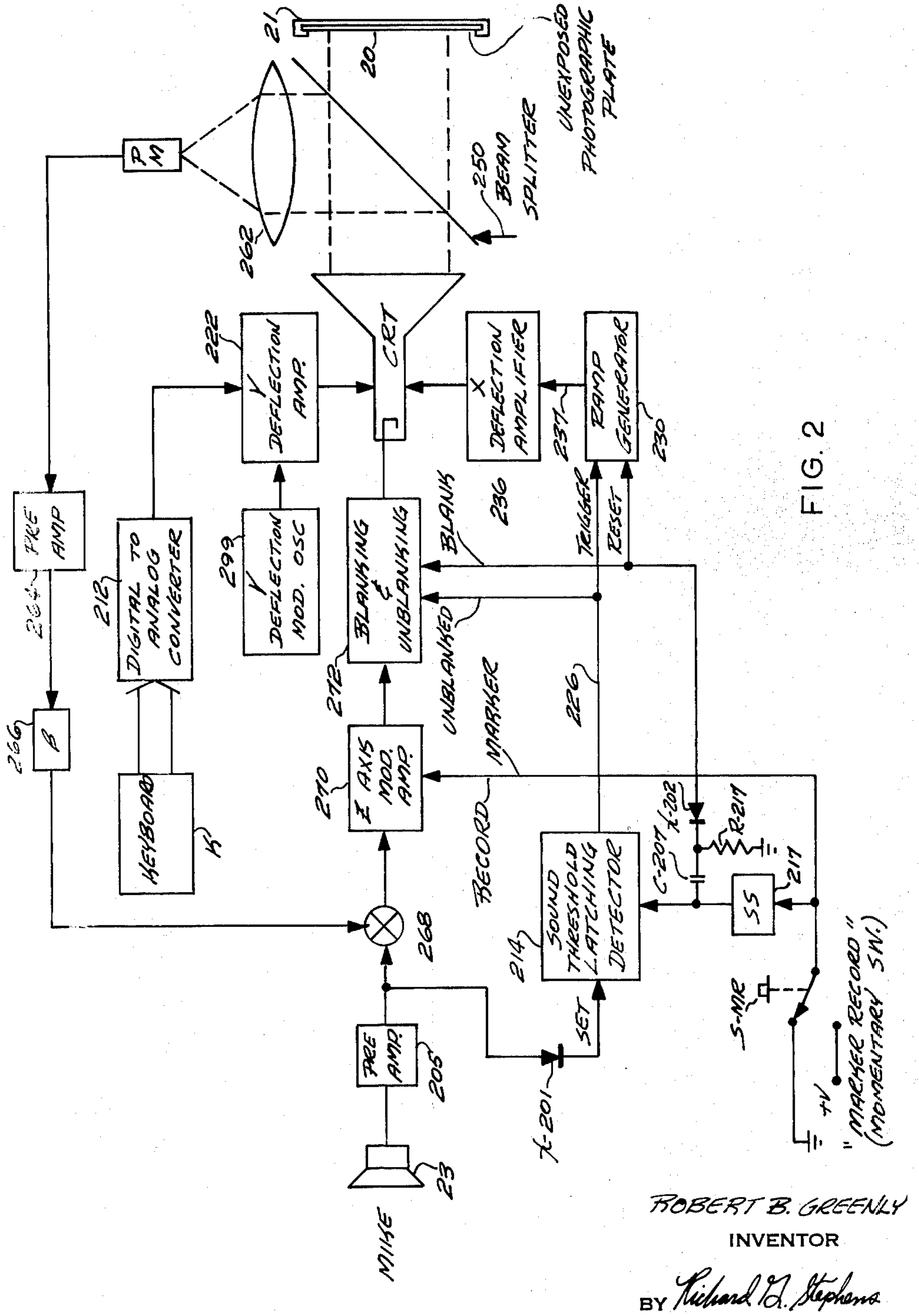
FIG. 2 is an electrical schematic diagram illustrating an exemplary audio recording device constructed in accordance with the invention.

The recording operation using the apparatus of FIG. 2 may be seen to involve the following steps:

(1) Insertion of an unexposed photographic record plate into photographic plate holder 21.

(2) Keyboard selection of the first vocabulary word track position by operation of keyboard K.

(3) Enunciation of the word into microphone 23 (and operation of "Marker Record" switch S–MR immediately upon completion of the enunciation of the word, as will be further explained below).

(4) Repetition of steps (2) and (3) for each other vocabulary word, until the complete vocabulary is recorded.

(5) Removal of exposed film plate 20 and conventional photographic development and fixing of same.

In FIG. 2 the keyboard K and digital-to-analog converter 212 serve to provide a unique Y axis deflection voltage for each different key on the keyboard, thereby positioning the CRT beam in a vertical sense to a selected one of the horizontal tracks to be recorded on the photographic plate. One very simple form of keyboard and converter may comprise merely a multi-tap voltage divider having different taps connected by different switches operated by respective keys of the keyboard. The horizontal, or X deflection system 236 of the CRT is biased so that the CRT beam is positioned at the left extremity of the CRT (i.e., on line 15 in FIG. 1) in the absence of any voltage from ramp generator 230.

After selection of the desired track, the enunciation of a word into microphone 23 starts the operation of the system, sound threshold latching detector 214 being connected to be "set" by the amplified audio output from pre-amplifier 205. Latching detector 214 may comprise a conventional Eccles-Jordan flip-flop biased to "set" only when the output voltage from pre-amplifier 205 is of sufficient magnitude to indicate that enunciation of a word has commenced, and not to be set by background or circuit noise. To set a direct-coupled electronic switching circuit such as an Eccles-Jordan flip-flop, the audio voltage output from amplifier 205 may be demodulated, as by means of a rectifier shown as comprising diode X–201. Setting of detector 214 provides an output trigger pulse on line 226 to trigger sawtooth or ramp generator 230. Ramp generator 230 then applies a linearly-increasing output voltage to X deflection amplifier 236 via line 237, thereby causing the CRT beam to sweep horizontally, to the right as viewed in FIG. 1, across the selected track at a rate depending upon the slope of the sawtooth voltage generated by ramp generator 230. The amplified enunciated word signal from amplifier 205 also is applied via difference amplifier 268 and Z axis modulation amplifier 270, and thence via blanking circut 272 to the grid-cathode circuit of the CRT. As well as triggering ramp generator 230 to begin horizontal deflection, the output trigger pulse provided from latching detector 214 upon commencement of a word also serves to "unblank" the unblanking circuit 272, so that a voltage proportional to the Z axis amplifier 270 output voltage will be applied to the CRT grid-cathode circuti, thereby modulating the intensity of the CRT electron beam in accordance with the audio sound.

The light from the spot on the face of the CRT is applied via beam splitter 250 to expose the photographic plate 20 positioned in holder 21. A portion of the light applied to beam splitter 250 is directed via condensing lens 262 to a photo-sensitive detector shown as comprising a photo-multiplier PM, which provides an electrical audio feedback signal via amplifier 264 and feedback impedance 266, thereby tending to linearize the audio system shown.

Operation of momentary "Marker Record" switch S–MR upon completion of the enunciation of the word operates a conventional "single-shot" multivibrator 217, immediately providing a single output pulse of predetermined width or duration. The trailing edge of the single-shot pulse is connected to reset latching detector 214, to reset blanking circuit 272 to its "blanked" or "beam cut off" condition, and to reset ramp generator 230 to its zero output voltage condition. The recorder of FIG. 2 is then in proper condition for selection of another track by means of keyboard K and for recording of another word.

In FIG. 2 a small amplitude super-audible signal (approximately 30 kc. or higher) is shown as being generated by Y deflection modulation oscillator 299 and connected to Y deflection amplifier 222 to be superimposed on the analog vertical-positioning voltage derived by the operation of keyboard K and converter 212. Superimposing such a signal during recording effectively converts the circular beam spot to a vertical recording "slit," thereby increasing the height of each recorded track. As will be apparent, the amplitude of the super-audio signal may be arranged so that the upper and lower edges of adjacent tracks are near each other but do not overlap. Increasing the height of each track considerably relaxes the Y position accuracy requirement which otherwise would be needed during the playback mode.

The abovementioned operation of "Marker Record" switch S–MR immediately upon completion of each "word" serves to record a "marker" signal denoting the end of each "word," since the various words of a desired vocabulary usually will consume different amounts of time, and provision of uniform time intervals for different words would result in disconcerting gaps of varying length during playback of many plural-word sequences. By detecting the marker signals electronically during playback, in a manner to be described below, the scanning system of the invention is "indexed," or caused immediately to retrace to the next word position, thereby avoiding such gaps in plural-word sequences.

Usual applications of the invention require that output messages be composed of varying sequences of the stored words or phrases, and because the composition of each message is determined by an applied digitally coded signal, the storage system must be truly random access in order to maintain proper word spacing in an output message selected from a large vocabulary.

Figure 1:
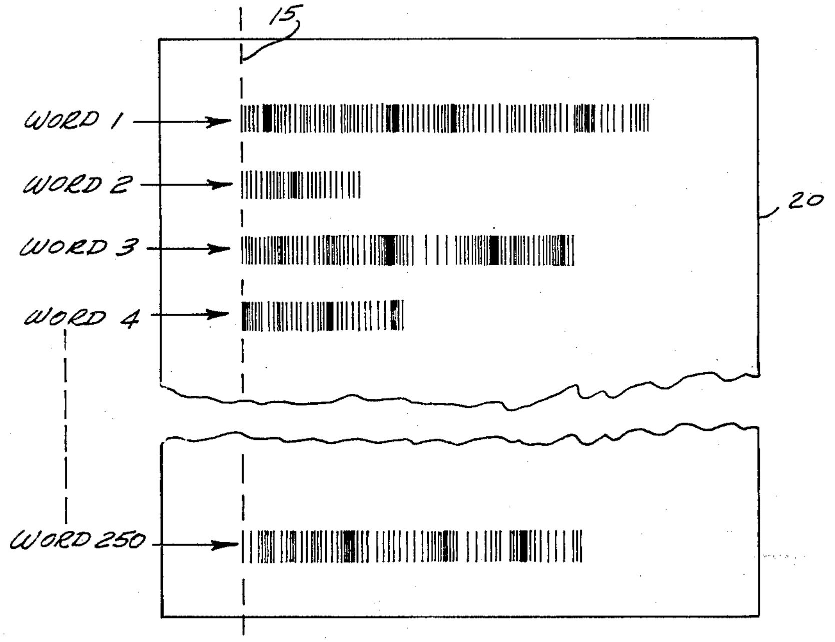
FIG. 1 is a diagrammatic view useful in understanding one exemplary pattern in which audio words may be stored in separate tracks by variable optical density recording on a photographic film plate in accordance with the invention.

In the playback apparatus shown in FIG. 3, digital input signals, preferably parallel by bit and serial by word, are applied via a plurality of coincidence gates indicated for convenience collectively at 310 to digital-to-analog converter 312, "AND" gates 310 being controlled by an enabling signal applied from sequencer 314 via line 316. An individual AND gate is included in coincidence gate group 310 for each digit in the applied parallel binary signal, and all gates in group 310 are controlled by the enabling signal. Converter 312 preferably comprises a conventional "ladder" type of digital to analog converter, so that application of the successive parallel digital signals comprising an entire message derives a succession of analog voltages representing assigned Y positions on the photographic memory negative. Assume, for purposes of explanation, that, as shown in FIG. 1, the memory negative is provided with 250 vertically spaced audio tracks numbered from the top as shown, and that parallel binary signals 1011, then 1100, and then 101 were applied during three successive time intervals to converter 312. Using a completely straightforward coding system, analog output voltages of 11 volts, then 12 volts, and then 5 volts would be provided from converter 312 during the three successive time intervals. If the exemplary three-word message consisted of three successive words requiring 0.6 second, 0.8 second and 1.0 second, respectively, the 11 volt voltage would last for 0.6 second, then converter 312 would provide the 12 volt signal for 0.8 second, and then the 5 volt signal for 1.0 second. The analog voltages are applied, as shown in FIG. 3, to the Y deflection system 322 of the cathode ray tube CRT of the scanning system, thereby repositioning the CRT beam in the Y direction of the memory negative. As soon as the beam is positioned at any given Y position, sequencer 314 applies a trigger pulse via line 326 to a conventional ramp or sawtooth generator 330, causing the ramp generator to provide a linearly-increasing output voltage on line 332. The X deflection system 336 of the scanning system is biased so that the CRT beam is positioned on the left side of the CRT face (at line 15 in FIG. 1), in the absence of any X signal on line 332, and therefore the beam scans rightwardly in line with the selected track of the memory negative as the increasing X voltage from ramp generator 330 is applied to amplifier 336. The light from the CRT spot passes through a conventional optical beam splitter 350, which may comprise, for example, a half-silvered mirror, through the recorded memory negative 20, which intensity modulates the light, and through lens 354, which focuses the modulated light beam on a photosensitive detector shown as comprising photomultiplier tube PM. Because the light impinging on photosensitive detector PM is intensity modulated in accordance with the audio which previously had been recorded with variable density on the memory negative, the sound originally recorded will be reproduced. The audio signal from the photosensitive detector PM is shown connected to be amplified by amplifier 358 and then applied to operate an output device. In FIG. 3 the output device is shown as comprising audio power amplifier 360 and loudspeaker 362, but it will be apparent to those skilled in the art that the output device may take a variety of different forms. In some applications of the invention, the signal will be applied to the modulating circuit of a radio transmitter, or connected to a telephone line, or applied to a further recorder to be played back at some future time.

To prevent distortion which otherwise might be caused by circuit non-linearities, by changes in cathode emission or by other operating parameters of the cathode ray tube, beam splitter 350 splits off a portion of the light from the spot on the cathode ray tube face, and lens 362 focuses such light on a second photosensitive detector PM–2, to provide a feedback signal to control CRT spot luminosity. The feedback control signal is amplified by direct-coupled amplifier 364 and applied via feedback impedance circuit means 366 to control the cathode grid voltage, and hence the spot luminosity of the cathode ray tube. The feedback control voltage from feedback impedance 366 is compared by difference amplifier 368 with a reference voltage from potentiometer R–300, providing an error signal which is amplified by amplifier 370. The output signal from amplifier 370 is applied via blanking circuit 372 to control the grid-cathode voltage, and hence the spot luminosity, of the cathode ray tube scanner. Blanking circuit 372 comprises conventional analog gate circuitry RY, so that the control voltage on line 374 will be driven far enough negative to cut off the CRT beam upon application of a blanking pulse via line 326, but so that a voltage varying proportionally to the amplifier 370 output will be applied to cathode C of the CRT when the unblanking line is energized. Increasing the amount of negative feedback, by increasing the loop gain of the feedback circuit shown, tends to make CRT spot luminosity independent of the emission characteristics of each of the tubes or transistors involved in the circuit. Adjustment of the reference voltage on the wiper of potentiometer R–300 by means of control knob 371 allows the average luminosity to be set to a desired value, so that slightly "underdeveloped" and "overdeveloped" memory negatives may be made to produce substantially the same amplitude of output signal as ideally developed negatives. If desired, a reference amplitude tone may be recorded on one track of each memory negative, and means automatically operable to measure the audio output may be used to measure the audio output when the reference amplitude tone track is scanned to derive the proper amplitude of reference signal to be applied to comparison amplifier 368 throughout the time the associated memory negative is used. As shown in FIG. 6, closure of switch S–7, which may be operated by a "Level Set" key on keyboard K, is operative to energize relay K–7. The "Level Set" key also provides the proper analog voltage from converter 312 to position the CRT beam vertically to the track upon which the reference level tone has been recorded. Closure of relay K–7 connects the output of preamplifier 358 through diode X–701 to the grid of cathode follower tube V–701 and applies a pulse through capacitor C–702 to trigger ramp generator 330. Capacitor C–701, preferably a polystyrene capacitor having low leakage, is connected to the grid of the tube V–701, and during scanning of the reference tone track capacitor C–701 becomes charged to a level commensurate with the recorded amplitude of the reference tone. Upon release of the "Level Set" key capacitor C–701 is disconnected and maintains the cathode follower grid as its charged potential. A further contact *b* on relay K–7 disconnects grid resistor R–702 upon release of the "Level Set" key to prevent discharge of capacitor C–701 through the resistor. The cathode follower output signal is applied via summing resistor R–703 to be summed with a constant voltage applied via resistor 704, and the albegraic sum of the two voltages determines the excitation voltage of potentiometer R–300. Contact *c* of relay K–7 disconnects the feedback signal during scanning of the reference tone track.

The audio output signal from amplifier 358 also is routed, as shown in FIG. 3, to operate marker threshold detector 359, which may comprise for example, a conventional Schmitt trigger circuit. Upon completion of the scanning of a word, the signal occurring from photodetector PM and amplifier 358 as the beam reaches the blanked end of the track will provide a reset signal from detector 359 to reset ramp generator 330 (thereby retracing the CRT beam to the left), to reset or blank the CRT, and to advance sequencer 314 to the next Y coordinate position to reproduce the next selected word.

While shown as a sequencer, block 314 is intended to represent the readout portion of the digital computer or other data-processing device which is utilized to apply the input digital data to the playback apparatus. The output signal from the marker threshold detector is connected to provide a readout command signal to the computer, and the usually available computer signal indicating that new data is available to be applied to converter 312 is used to trigger ramp generator 330 and enable "and" gates 310. In the absence of any input data from the computer, converter 312 positions the beam to scan a blank track at the zero *y* position.

It will be apparent from a comparison of FIGS. 2 and 3 that many of the circuits shown appear in both figures, and therefore are used for both the recording mode and the playback mode. Since recording does not take place during playback, nor vice versa, it should be apparent now that construction of a single machine switchable between recording and playback modes is possible and desirable, not only in the interests of economy, but also because use of the same equipment during both modes tends to cancel out during reproduction, distortion caused during recording by circuit non-linearities. Such a combined, or dual-mode device is shown in FIG. 4, with a plurality of switches shown to connect the machine in either of its two intended operating modes. It will be evident that all of the two-position "Record-Playback" switches may be ganged, if desired. Having described FIGS. 2 and 3 in detail, no detailed description of FIG. 4 is believed to be necessary, except for a few additional features of FIG. 4.

Recording of properly or ideally enunciated words frequently may be improved by pre-recording the desired vocabulary on a conventional magnetic tape recorder, carefully editing the tape, and then using the tape in lieu of the microphone as the recording input for photographic film plate storage. Markers may be recorded on the magnetic tape as well as the words, by recording each marker as a tone burst at a frequency (for example, 25 kc.) above the selected system bandwidth merely by use of an oscillator 503 and a switch SW–5 as shown in FIG. 5. A filter F tuned to the selected marker tone frequency may be connected to the magnetic tape recorder playback head PH to provide a signal, which after rectification and amplification, may be used as the "Marker Record" signal on line 420 in FIG. 4. The magnetically recorded tone burst also is shown connected to beat with a further signal from oscillator 503 to provide an aural output useful while editing the tape. Upon occurrence of a tone burst, the CRT spot is driven to full brightness.

To allow such pre-recording, pre-amplifier 405 in FIG. 4 is shown as including an alternate input line from a magnetic tape recorder (not shown), and "Marker Record" signal line 420 is provide with a terminal 403 which may be connected to the similarly numbered terminal of FIG. 5. To aid editing of the magnetic tape it is frequently useful to play portions of it at a reduced, less than "real-time" speed, and to properly detect markers when playing at reduced speed, filter means F may be made switchable to the appropriate lower frequency.

Rather than a beam splitter, a pair of wide angle lenses are shown in FIG. 4 for the same purpose of providing the two light paths needed for recording or playback and monitoring.

One exemplary design in accordance with the invention utilized a CBS type 7AWP5 cathode ray tube, a high-resolution (1350 optical lines per inch) having a peak wavelength in the blue region of the spectrum, at about 4300 A. Magnetic focusing and deflection is utilized. The deflection systems shown in FIGS. 2–4 were conventional, incorporating conventional techniques to overcome deflection coil inductance. Electrostatic deflection and focusing may be substituted without departing from the invention. To achieve acceptable audio response, the decay time of the CRT phosphor must be much less than the minimum wavelength to be recorded and reproduced. For example, to use a 3000 c.p.s. audio signal, a decay time of about 300 microseconds is required. Phosphor decay time should be as short as possible to achieve high system frequency response but long enough to provide sufficient light for film exposure during recording. The P5 phosphor of the exemplary design has a decay time (time to fall to 10% maximum brightness) of about 10 microseconds.

In the exemplary design, a 5 inch square was utilized on the face of the 7 inch diameter tube. Using a .001 inch diameter scanning spot, the theoretical maximum possible bit storage in the 5″ x 5″ area would be $25\times10^6$, but such an arrangement would require extremely accurate beam positioning. Rather than using the theoretical maximum of 1000 tracks per vertical inch, the exemplary design incorporates 50 tracks per inch, which can be easily scanned both accurately and with good repeatability. Using 50 tracks per inch, or 250 tracks on the 5 inch square of the photographic negative, it will be seen that 250 words or messages may be stored on a single 5″ film plate. Using a .001 inch diameter scanning spot, the 5000 elements in any particular horizontal track are sufficient to provide very intelligible output audio signals. The exemplary design desired system frequency response covered about 300 to 3000 cycles per second. It is necessary, of course, that the photographic film to be used with the invention have adequate resolving power, and commercially readily available film having resolution of 80 lines per millimeter will ordinarily be satisfactory. While it is possible to intensity modulate during recording so that the spot intensity varies between maximum brightness and "grey," or roughly 50% light transmission, it is preferable to completely darken or cut off the beam during periods of silence.

An approximate method for estimating the overall system resolution is to compute the reciprocal of the square root of the sum of all of the reciprocals squared of the individual element resolutions. For example, assuming the following:

$R_1$ (the CRT resolution)=40 lines per mm.
$R_2$ (optics resolution)=200 lines per mm.
$R_3$ (film resolution)=80 lines per mm.

and doubling each reciprocal because resolution limitations affect operation both during recording and playback, $$\text{Overall resolution}=\frac{1}{\sqrt{2(1/R_1)^2+2(1/R_2)^2+2(1/R_3)^2}}$$

=25 lines/mm. or about 625 lines per inch.

To store a one-second message with a bandwidth of 3000 c.p.s., 3000/625, or about 5 inches of recording track will be seen to be required. Most words can be enunciated and understood in less than one second, of course. Those which exceed one second may be continued on adjacent tracks. The time required to retrace and reposition the beam to an adjacent track can easily be made less than 100 milliseconds, and studies have shown that silence intervals of such short duration do not crucially deteriorate intelligibility.

Where a lengthy word or message is to be recorded on several adjacent tracks, automatic retrace of the X deflection may be provided by resetting the horizontal deflection ramp generator if the "Marker Record" button is not depressed before the ramp generator reaches its maximum output potential. In FIG. 4 the horizontal deflection ramp generator output is shown connected through inverting amplifier 411 to the input circuit of the marker threshold detector. When, and if, the positive-going output voltage of the ramp generator exceeds the negative bias voltage applied to amplifier 411, the marker threshold detector will be switched by the negative output from the amplifier 411, immediately retracing the beam, and causing the sequencing system to re-trigger the ramp generator.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Random access sound recording apparatus, comprising, in combination: a cathode ray tube having means for producing an electron beam operative to produce a spot of light on the face of said tube and beam-positioning means operable to deflect said beam to position said spot of light on said face in each of first and second orthogonally related directions, independently; means for positioning an unexposed photographic plate in a fixed position relative to said cathode ray tube so as to direct light from the face of said cathode ray tube onto said photographic plate to expose said plate; an audio signal input circuit adapted to receive audio input signals; first circuit means connected to said audio signal input circuit and to said cathode ray tube for intensity modulating said electron beam in accordance with said audio input signals a source of unique digital numbers each identifying one of said audio input signals; means responsive to said digital numbers and coupled to said beam-positioning means for providing an analog voltage commensurate with the value of each of said unique digital numbers; and said beam-positioning means being further operative to deflect said beam along one of said first and second directions in accordance with the magnitude of said provided analog voltage.

2. Apparatus according to claim 1 in which said beam-positioning means includes a first deflection voltage generating system responsive to successive ones of said unique digital numbers for positioning said beam to discrete successive different positions, and a second deflection voltage generating system operable after each re-positioning of said beam by said first deflection voltage generating system to provide a time varying voltage to deflect said beam along paths of predetermined shape, thereby to photographically record said audio signals along said paths.

3. Apparatus according to claim 1 in which said beam-positioning means includes a first deflection voltage generating system responsive to successive ones of said unique digital numbers for positioning said beam to discrete successive positions in one coordinate direction of a reference orthogonal coordinate system, and a deflection voltage function generator for producing a time-varying second voltage to deflect said beam continuously in a second coordinate direction of said reference coordinate system.

4. Apparatus according to claim 2 in which said first deflection voltage generating system includes converter means responsive to successive ones of said unique digital numbers for providing respective successive analog voltages for positioning said beam.

5. Apparatus according to claim 2 in which said second deflection voltage generating system includes voltage function generating means connected to be triggered upon initiation of each of said audio signals and operative to provide a time-varying voltage of predetermined function.

6. Apparatus according to claim 2 having a blanking circuit connected to control the intensity of said electron beam, detector means connected to said audio signal input circuit for causing said blanking circuit to unblank said electron beam upon receipt of audio input signals having a predetermined amplitude level, and means connected to said blanking circuit for resetting said blanking circuit to blank said electron beam.

7. Apparatus according to claim 2 having photo detector means, optical means interposed between said face of said cathode ray tube and said means for positioning said photographic plate for directing a portion of the light on said face of said cathode ray tube to said photodetector means thereby to provide feedback signals, and second circuit means connecting said feedback signals to said first circuit means to control the intensity modulation of said electron beam.

8. Apparatus according to claim 2 in which said first circuit means includes amplifier means connected to amplify said audio input signals, and third circuit means including a blanking circuit for applying the output signal from said amplifier to the grid-cathode circuit of said cathode ray tube.

9. Apparatus according to claim 2 in which said first deflection voltage generating system includes first beam deflection means arranged to position said beam in a first direction, and in which said second deflection voltage generating system includes second beam deflection means arranged to position said beam in a second direction perpendicular to said first direction.

10. Apparatus according to claim 4 including oscillator means for providing an electrical signal of superaudible frequency, and means for superimposing said superaudible electrical signal on said analog voltages.

11. Apparatus according to claim 4 in which said converter means comprises a keyboard having a plurality of individual keys each adapted upon operation to provide a different digital signal representative of an unique number, and a digital-to-analog converter connected to be operated by said digital signals to provide respective different analog voltage for positioning said beam.

12. Apparatus according to claim 5 in which said voltage function generating means comprising a ramp voltage generator.

13. Apparatus according to claim 6 in which said means for resetting said blanking circuit comprises manual switch means and in which said detector means comprises a bistable electronic circuit connected to be set by said audio input signals and to be reset by said manual switch means.

14. Apparatus according to claim 7 in which said first circuit means includes amplifier means connected to receive said audio input signals and said feedback signals and to provide amplified signals commensurate with the algebraic sum thereof, and third circuit means for applying said amplified signals to the grid-cathode circuit of said cathode ray tube.

15. Apparatus according to claim 7 in which said optical means includes an optical beam splitter.

16. Apparatus according to claim 7 in which said optical means comprises first and second wide angle lenses, the first of said wide angle lenses being arranged to direct light from the face of said cathode ray tube toward said photodetecto means, and the second of said wide angle lenses being arranged to direct light from the face of said cathode ray tube toward said photographic plate.

17. Random access sound reproducing apparatus, comprising, in combination: a cathode ray tube having means for providing an electron beam operative to produce a spot of light on the face of said tube and beam-positioning means operable to deflect said beam to position said spot of light on said tube face in each of first and second orthogonally related directions, independently; photosensitive detector means; means for fixedly positioning an intensity-modulated photographic transparency plate between said face of said cathode ray tube and said photosensitive detector means, said transparency being effective to vary the amount of light passing from said cathode ray tube to said photosensitive detector means in accordance with the intensity modulation on said photographic transparency a source providing a selective sequence of unique digital numbers; means responsive to said digital numbers and coupled to said beam-positioning means for providing an analog voltage commensurate with the value of each of said unique digital numbers; and said beam-positioning means being further operative to deflect said beam along one of said first and second directions in accordance with the magnitude of said provided analog voltage.

18. Apparatus according to claim 17 in which said beam-positioning means includes a first deflection voltage generating system responsive to said selective sequence of unique digital numbers for positioning said beam to discrete successive different positions, and a second deflection voltage generating system operable after each re-positioning of said beam by said first deflection voltage generating system to provide a time-varying voltage to deflect said beam along paths of predetermined shape, thereby to photographically record said audio signals along said paths.

19. Apparatus according to claim 17 in which said beam-positioning means includes a first deflection voltage generating system responsive to said selective sequence of unique digital numbers for positioning said beam to discrete successive positions in one coordinate direction of a reference coordinate system, and a deflection voltage function generator for producing a time-varying second voltage to deflect said beam continuously in a second coordinate direction of said reference coordinate system.

20. Apparatus according to claim 18 in which said first deflection voltage generating system includes converter means responsive to said selective sequence of unique digital numbers for providing respective successive analog voltages for positioning said beam.

References Cited by the Examiner

UNITED STATES PATENTS

| | | | |
|---|---|---|---|
| 2,363,502 | 11/44 | Collins | 179—100.3 |
| 2,477,640 | 8/49 | Montague | 179—100.3 |
| 2,596,741 | 5/52 | Tyler et al. | 346—33 |
| 2,681,382 | 6/54 | Hilburn | 179—100.3 X |
| 2,830,285 | 4/58 | Davis | 340—173 |
| 2,834,005 | 5/58 | Ketchledge | 340—173 |

FOREIGN PATENTS

| | | | |
|---|---|---|---|
| 1,007,650 | 5/52 | France. | |

IRVING L. SRAGOW, *Primary Examiner.*

BERNARD KONICK, *Examiner.*